No. 770,147. PATENTED SEPT. 13, 1904.
W. L. AUSTIN.
LOOSE WHEEL STRUCTURE.
APPLICATION FILED JAN. 27, 1904.
NO MODEL.
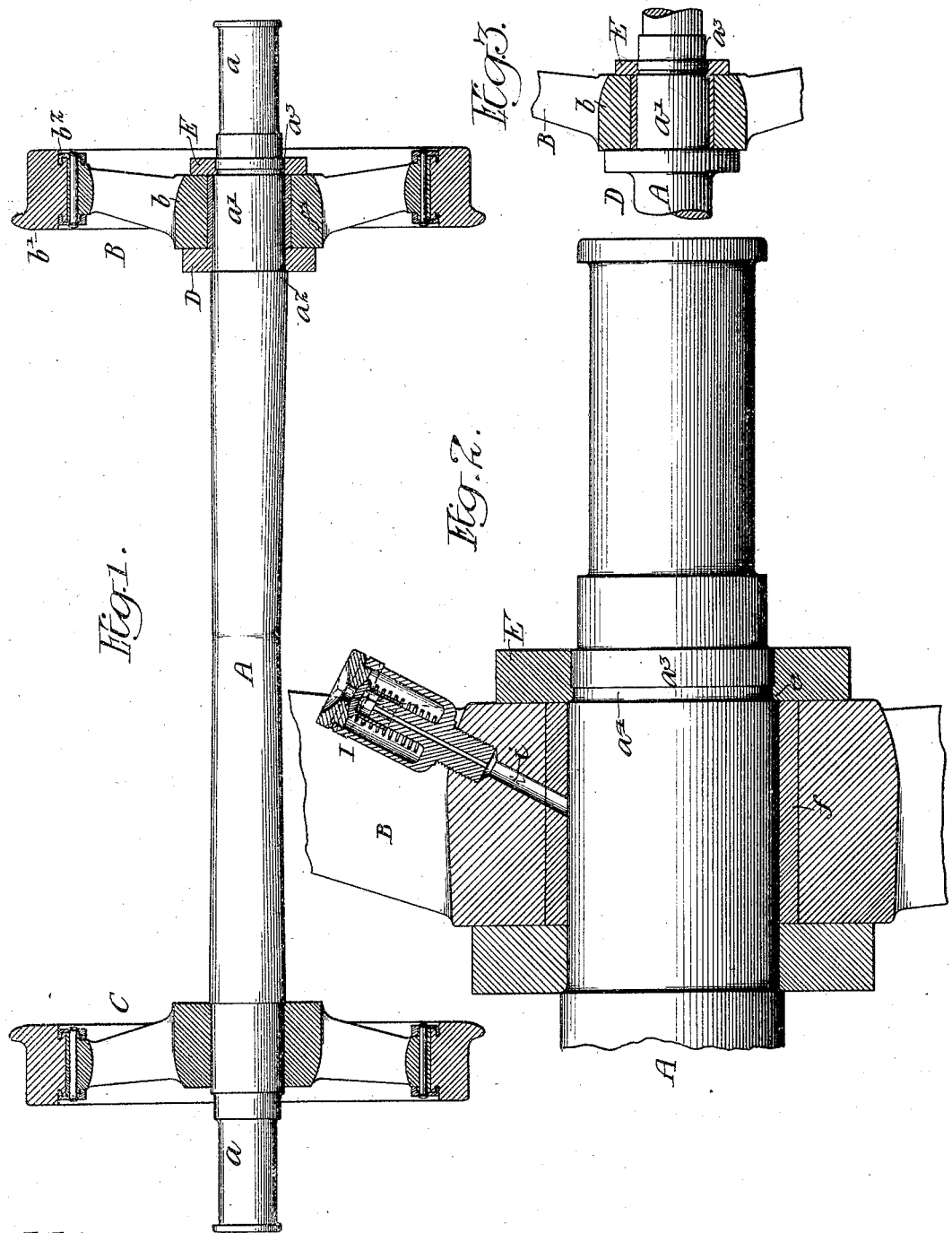

No. 770,147. Patented September 13, 1904.

UNITED STATES PATENT OFFICE.

WILLIAM L. AUSTIN, OF PHILADELPHIA, PENNSYLVANIA, ASSIGNOR TO BURNHAM, WILLIAMS & COMPANY, OF PHILADELPHIA, PENNSYLVANIA, A FIRM.

LOOSE-WHEEL STRUCTURE.

SPECIFICATION forming part of Letters Patent No. 770,147, dated September 13, 1904.

Application filed January 27, 1904. Serial No. 190,862. (No model.)

*To all whom it may concern:*

Be it known that I, WILLIAM L. AUSTIN, a citizen of the United States, residing in Philadelphia, Pennsylvania, have invented certain Improvements in Loose-Wheel Structures, of which the following is a specification.

My invention relates to certain improvements in wheels and axles in which a wheel is loose on the axle.

My invention is especially applicable for use in connection with the truck illustrated in the patent granted to me on the 2d day of February, 1904, No. 751,243.

The object of my invention is to improve the means of mounting the loose wheel on the axle.

In the accompanying drawings, Figure 1 is a view of an axle, showing the wheels in section. Fig. 2 is an enlarged view of part of Fig. 1, and Fig. 3 is a view of a modification.

A is the axle, having reduced portions $a\ a$, which are mounted in the usual journal-boxes.

C is a wheel of any of the ordinary forms, which is secured to the axle.

B is a wheel loose on the axle. This wheel is made in two parts—a hub or center section $b$ and a rim-section $b'$—secured together by rings $b^2$; but it will be understood that the wheel may be made in a single piece or made in any well-known form, as I make no claim to the particular type of wheel.

The axle is reduced at $a'$, forming a shoulder $a^2$, and is reduced at $a^3$. Shrunk on the portion $a'$ of the axle is a ring D, resting against the shoulder $a^2$.

The hub $b$ of the wheel B is mounted between the ring D and a ring E, shrunk on the portion $a^3$. This ring has an internal flange $e$, which rests in a groove $a^4$, so that when the ring E is shrunk upon the axle the internal flange enters the groove and retains the ring in place.

The wheel B is preferably provided with a bushing $f$, as shown.

I have illustrated in Fig. 2 a lubricating-passage $i$ and an ordinary form of lubricator I, screwed into the mouth of this passage, so as to lubricate the bearing between the wheel and the axle, as it will be understood that the wheel can freely turn on the axle, the object being to allow the axle and wheel to turn independently when the car, for instance, is passing around a curve.

In Fig. 3 I have shown the inner ring D' in the form of a flange formed on the axle instead of being a separate ring shrunk thereon.

By my invention I simplify the means of attaching the wheel to the axle and provide an attachment which dispenses with the use of bolts or other fastenings which are liable to become detached.

I claim as my invention—

1. The combination of an axle having a reduced portion, a wheel mounted on the reduced portion, an inner ring shrunk upon said reduced portion, a groove in the axle beyond the outer face of the wheel, a ring having an internal flange shrunk upon the axle and confining the wheel, substantially as described.

2. The combination of an axle having two reduced portions and having a groove between the two portions, a wheel mounted on the axle, an inner ring shrunk upon one reduced portion, an outer ring having an internal flange shrunk upon the other reduced portion, the flange of the ring entering the groove in the axle, with a wheel mounted loosely on the axle between the two rings, substantially as described.

In testimony whereof I have signed my name to this specification in the presence of two subscribing witnesses.

WM. L. AUSTIN.

Witnesses:
LEON P. THOMAS,
W. N. TUTTLE.